Oct. 27, 1959 E. W. BAUER ET AL 2,910,594

MAGNETIC CORE BUILDING BLOCK

Filed Feb. 8, 1955 4 Sheets-Sheet 1

INVENTORS
EDWIN W. BAUER
MUNRO K. HAYNES
BY
William V. Schelberg
AGENT

INVENTORS
EDWIN W. BAUER
MUNRO K. HAYNES
BY
William V. Schelberg
AGENT

Oct. 27, 1959 E. W. BAUER ET AL 2,910,594

MAGNETIC CORE BUILDING BLOCK

Filed Feb. 8, 1955 4 Sheets-Sheet 3

INVENTORS
EDWIN W. BAUER
MUNRO K. HAYNES

BY William V. Schelberg
AGENT

SERIAL FULL ADDER

INVENTORS
EDWIN W. BAUER
MUNRO K. HAYNES
BY
William V. Schelberg
AGENT

United States Patent Office 2,910,594

Patented Oct. 27, 1959

2,910,594

MAGNETIC CORE BUILDING BLOCK

Edwin W. Bauer and Munro K. Haynes, Poughkeepsie, N.Y., assignors to International Business Machines Corporation, New York, N.Y., a corporation of New York Application February 8, 1955, Serial No. 486,912

13 Claims. (Cl. 307—88)

The present invention relates to the employment of magnetic materials for the storage of binary digits and is directed to circuit arrangements adapted to be employed with other like arrangements as a building block in forming a system organization capable of performing logical switching functions.

Switching networks of various descriptions have application in calculator components as well as in many other types of machines employing electronic controls, and may be described broadly as digital devices to which input signals are applied and from which output signals are obtained that are some prescribed function of the input signals. Due to the inherent reliability of solid state devices such switching networks are desirably fabricated from magnetic cores, transistors, and diodes, and it is to networks comprising such devices that the present invention relates. In particular, a switching network comprising such devices is arranged as a packaged unit that is capable of performing all known logical switching functions when interconnected with other identical packaged networks.

In accordance with the invention, a saturable magnetic core is provided with an input winding to which signals are applied through diode logic, and with a pair of output windings which develop complementary output signals when the core is switched from one stable residual state to another. The network is adapted to operate in response to signals of short duration through the use of an amplifying and pulse stretching device that is incorporated in the input circuit with even wider operating latitude provided in a modification wherein a regeneration circuit is provided on the saturable core.

One form of the invention employs a transistor amplifier while a second form employs a further magnetic element in providing the desired amplification and shaping of the input signal pulse.

A broad object of the invention is to provide a saturable magnetic core switching component adapted to produce both true and complement output signals.

Another object is to provide a magnetic core switching network adapted for use with short duration input signals.

A more general object of the invention is to provide a solid state switching network as a packaged unit that may be employed with other like units for electronic control purposes.

Other objects of the invention will be pointed out in the following description and claims and illustrated in the accompanying drawings which disclose, by way of example, the principle of the invention and the best mode which has been contemplated of applying that principle.

Figure 3:
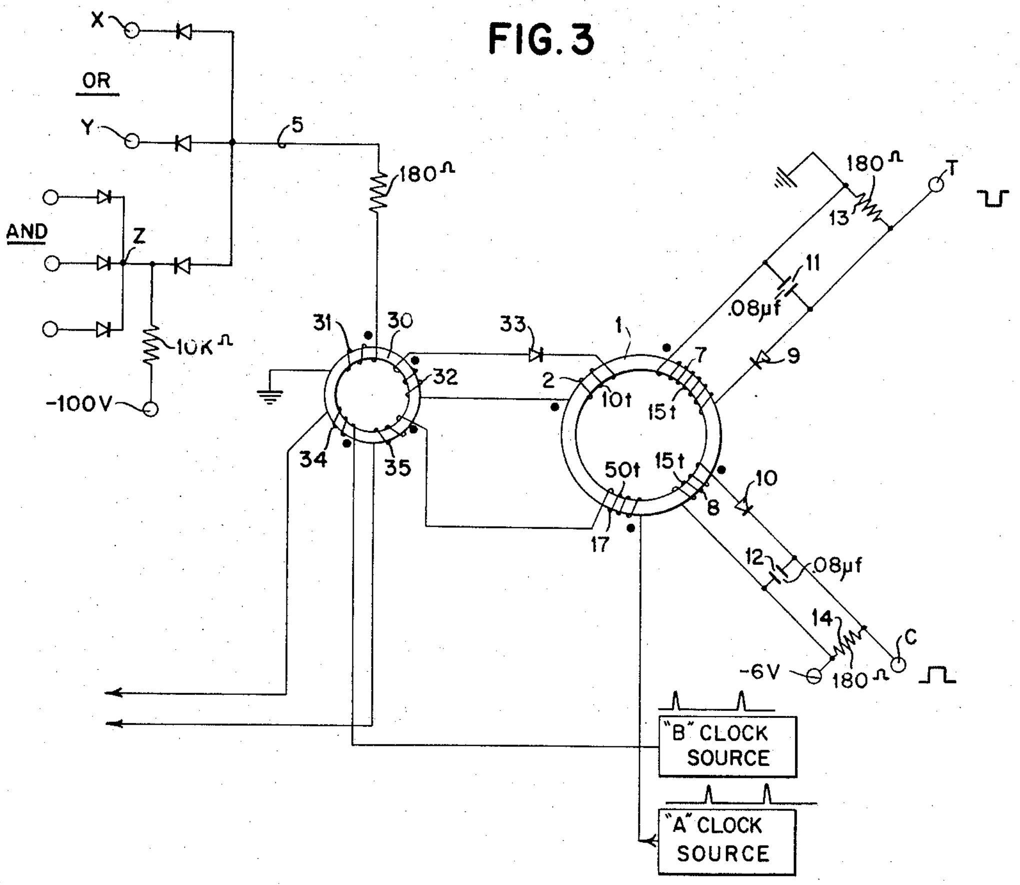

Figure 3 is a further form of the basic switching network wherein a magnetic amplifier is employed in the input circuit.

Figure 4:
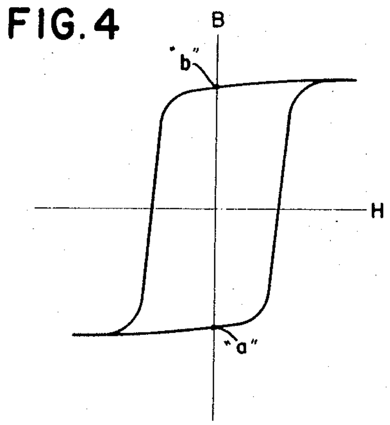

Figure 4 is a graphical illustration of the hysteresis characteristic of magnetic devices such as that used in the present invention.

Figure 1:
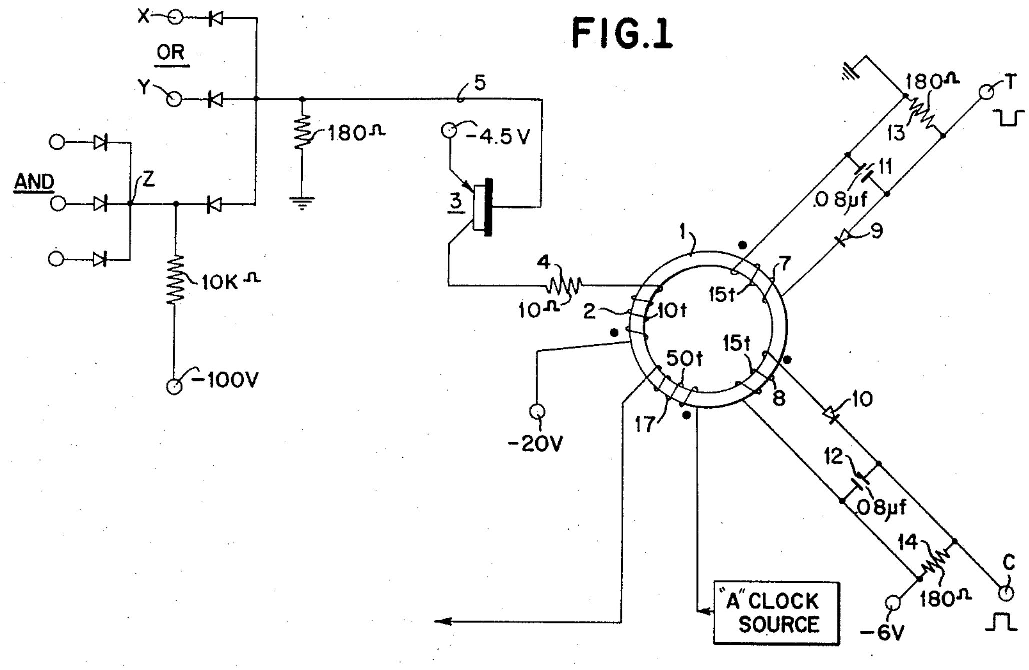
Figure 1 is a representation of the basic switching network employing a transistor amplifier device in the input circuit.
Figure 2:
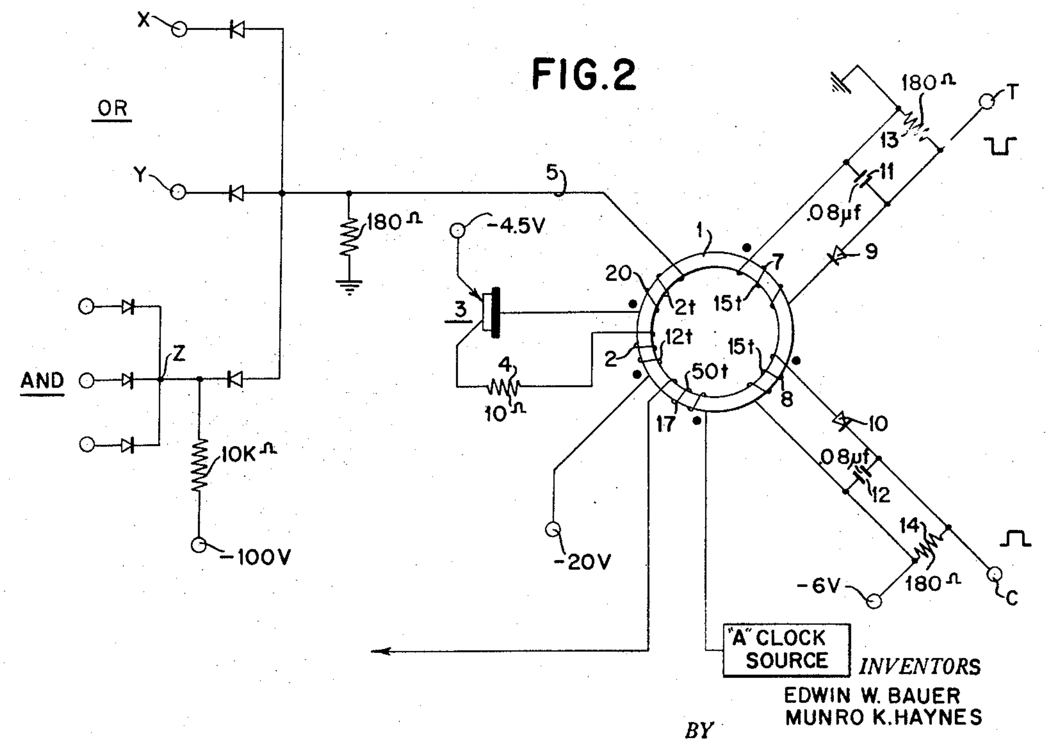
Figure 2 is a modification of the circuit of Figure 1 illustrating the use of a regeneration winding on the saturable magnetic core.
Figure 5:
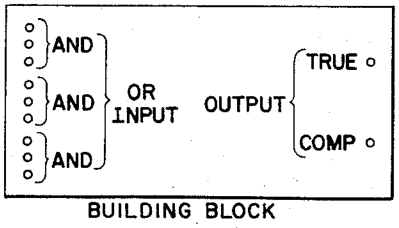

Figure 5 is a diagrammatic showing of a basic switching network such as that illustrated in detail in Figures 1 to 3.

Figure 6:
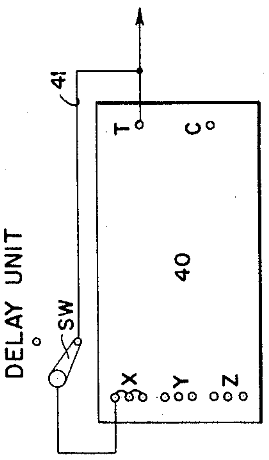

Figure 6 represents the circuit connections for a switching network employed as a pulse delay device.

Figure 7:
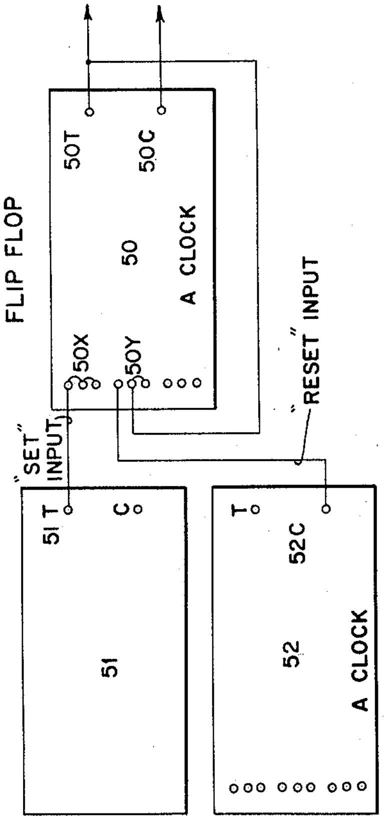

Figure 7 illustrates the external connections for providing a flip-flop from a single packaged unit.

Figure 8:
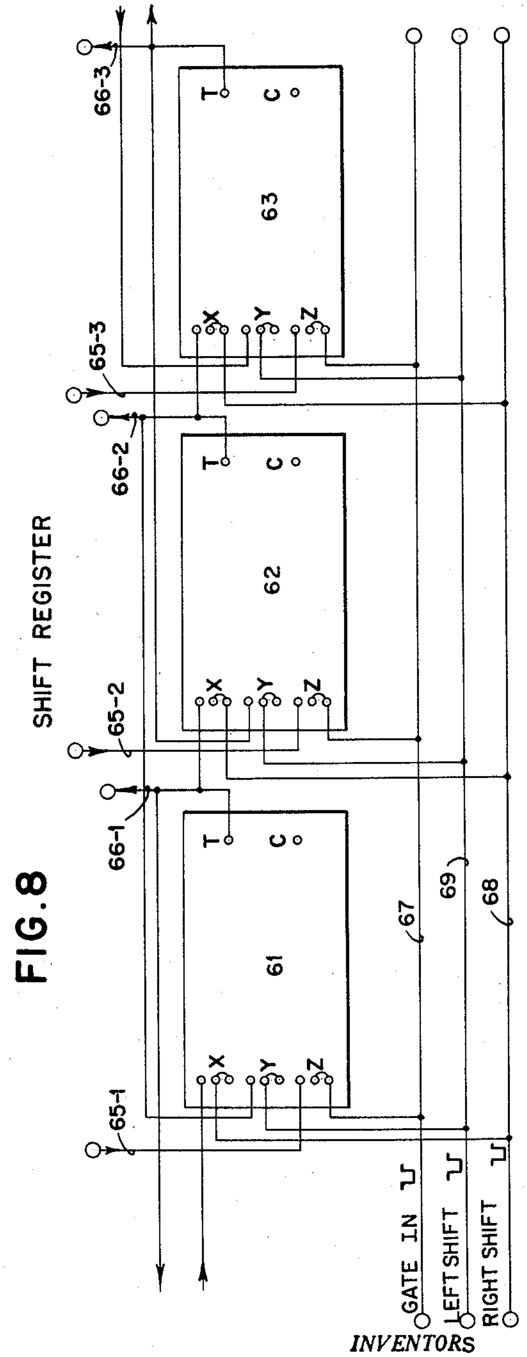

Figure 8 illustrates the use of a combination of packaged units connected to form a shift register.

Figure 9:
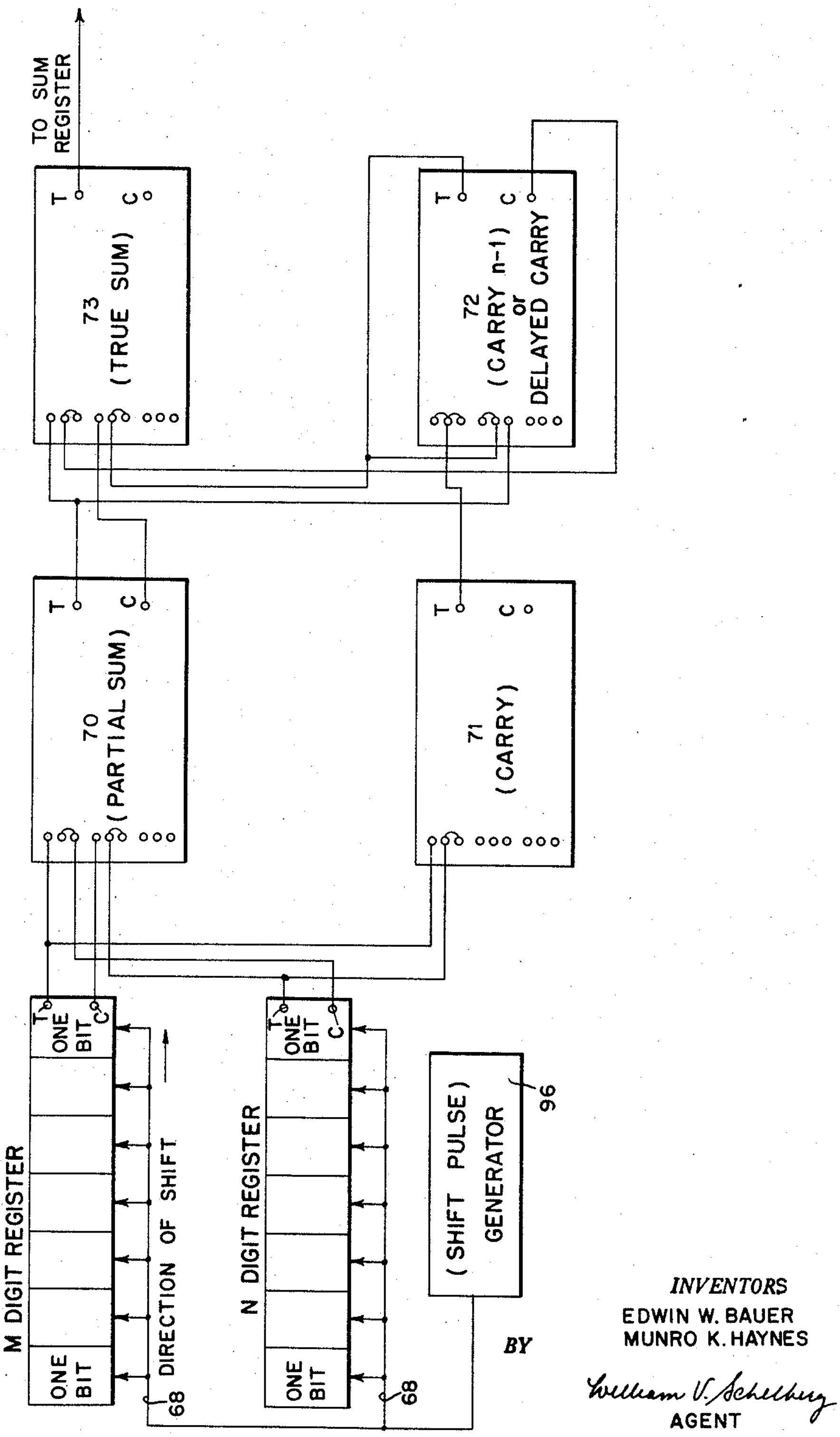

Figure 9 shows the connections for coupling a combination of packaged units to provide a full serial adder component.

Referring now to Figure 1, a basic switching network comprising a magnetic core, a transistor and several diodes is illustrated. Input signals are applied to the circuit through diode logic shown as a three way negative Or circuit having terminals designated as X, Y and Z. Each of these terminals is provided with a negative And circuit, however, only that for the terminal Z is illustrated in order to simplify the drawing. While a three way And circuit is shown in the figure, a two-way And circuit may be appropriate and, in specific applications this or other portions of the diode logic may be omitted where not required. In forming a complete building block, however, it is contemplated that these diodes be packaged along with the other devices shown, as for example in a suitable plastic potting compound, with the unused sections shorted out. The heart of the switching network comprises a magnetic core 1, having a hysteresis characteristic similar to that shown in Figure 4. An input winding 2 is provided on the core with one terminal connected to the collector electrode of a transistor 3 through a resistor 4, and the other terminal coupled to a negative bias source of —20 volts. The emitter electrode of the transistor is connected to a further negative bias source of —4.5 volts and the transistor base is connected to the output of the aforementioned diode circuitry through a lead 5. A dot marking is placed adjacent one end of winding 2 and other windings on the core as will be later described and indicates that that end is negative on write and positive on read pulsing of the core.

A pair of output windings labeled 7 and 8 is provided on the core 1 with these circuits having series diodes 9 and 10, shunt capacitors 11 and 12 and shunt resistors 13 and 14, respectively. One terminal of the resistor 13 is grounded and the other terminal coupled to an output connection labeled T, while one terminal of the resistor 14 is held at a negative bias of —6 volts and the other terminal coupled to a further output connection labeled C. An additional winding 17 is positioned about the core 1 and is energized from a source of A clock pulses not shown.

In describing the operation of the basic circuit, the core 1 is assumed to be in a magnetic state represented by point "*a*" on the hysteresis curve shown in Figure 4. An input pulse of negative polarity is applied to the transistor base through lead 5 as from the input terminal X, for example, and, as the transistor base potential is lowered, an amplified output pulse is developed at the collector terminal and applied through the resistor 4 to the winding 2. Current flow through the winding 2 is of such polarity and magnitude to cause the core 1 to switch from remanence point "*a*" to point "*b*," however, the voltage developed in the output windings 7 and 8 is blocked by the diodes 9 and 10 respectively, as will be noted from the dot markings. During the change in the magnetic state of core 1, the transistor 3 may remain in an "on" condition for an interval after the input pulse applied to terminal X has decayed if it should be of short duration, and the resistor 4 functions as a protective load device to limit the current dissipation of the transistor after the core has switched and the impedance of winding 2 has been reduced to a low value.

A pulse from the A clock source applied to winding 17 after the core is switched to state "*b*" causes the core to revert to state "*a*." This flux change develops voltages in each of the several core windings with that developed in the output coils 7 and 8 now of such polarity to pass the diodes 9 and 10. Terminal T now provides a true output and is subjected to a negative swing in voltage below ground potential as normally maintained thereon by the connection through resistor 13, while the capacitor 11 functions to stretch this negative pulse. A negated or complement output signal is produced simultaneously at terminal C. This terminal is normally held at −6 volts through the connection provided by resistor 14 to the bias source and is raised above ground potential to provide a positive voltage swing.

With input signals representing binary intelligence wherein the residual state "*b*" corresponds with a binary one and state "*a*" a binary zero, the network thus provides a device for handling information signals in logical fashion. The function of mixing inputs from several sources is provided by the diode logic with storage provided by the magnetic core until delivery is caused by application of the clock pulse as described.

With a binary one signal stored in the core, a true output is developed at terminal T as a negative pulse corresponding with the polarity of signals required to actuate the diode logic. Simultaneously with the delivery of a true output on terminal T, a complement output is developed on terminal C as a positive pulse. With positive rather than negative And-Or circuit logic employed, the positive output would become the true and the negative output the complement signal for indicating delivery of a binary one.

With a binary zero stored in the network through application of a positive pulse to the diode logic input, or in the absence of an applied pulse, the clock pulse develops no appreciable output signal from the network due to the rectangularity of the core hysteresis characteristic, and terminal T remains at ground level while terminal C remains at its negative bias level.

A modification of this circuit is shown in Figure 2 with provision made for increasing the operating latitude with respect to the duration of the information representing input signals. In this figure, elements corresponding with those described in connection with Figure 1 are given like reference designations. Input signals appearing on the lead 5 from the diode logic are applied through a regeneration winding to the base of the transistor 3. The transistor is triggered "on" by the signal and an amplified pulse is delivered through the winding 2 to switch the core. During switching, however, the winding 20 acts regeneratively since the flux change in the core in going from state "*a*" to state "*b*" induces a voltage in this winding that tends to maintain the transistor base negative and in an "on" state. This action lessens the core switching interval while allowing the switching to take place with wider latitude in the magnitude and duration of the input signal.

Referring now to Figure 3, a modification of the basic circuit is illustrated with the transistor amplifier replaced by a further magnetic core 30. In this form of the invention, input signals appearing on the lead 5 are applied to a winding 31 provided on the core 30. An output winding 32 on this core is coupled to the input winding 2 of core 1 through a pulse transfer link including a diode 33. A pair of windings 34 and 35 are provided on the core 30 with the latter winding energized in series with winding 17 of the core 1 from the A clock pulse source, and the winding 34 energized from a further clock pulse source, as shown, delivering B pulses which occur intermediate the A pulses.

Assuming both the core 30 and the core 1 are initially set at remanence point "*a*" on the hysteresis loop of Figure 4, an input signal appearing on lead 5 from the diode logic transverses coil 31 and causes core 30 to switch from state "*a*" to state "*b*," The B clock pulse on winding 34 subsequently resets the core 30 to state "*a*" and an output pulse is developed on the winding 32 that is of proper polarity to pass the diode 33 and the winding 2 of core 1. Core 1 then changes states going to point "*b*" on the hysteresis loop. Delivery of the following A clock pulse now causes core 1 to be reset to state "*a*" and the output windings 7 and 8 develop voltages of proper polarity to pass the diodes 9 and 10 and provide true and complement output signals on the respective terminals T and C. The A clock pulse is also applied to winding 35 of core 30 and functions to prevent writing into this core spuriously by backward transfer of information from core 1 to core 30 during intervals when core 1 is pulsed. Alternatively, such backward transfer may be blocked by driving the winding 34 both at A and B clock times and the winding 35 may be eliminated.

The basic circuit arrangements are shown diagrammatically in Figure 5 with only the input and output terminals indicated to more readily demonstrate employment singly or in groups for performing functions to be described in connection with subsequently numbered figures.

Figure 6 represents a single packaged unit 40 coupled externally to provide a pulse delay device. Here the delay unit is formed by connecting the true output terminal T to an Or input terminal through a lead 41. This is accomplished using only the external terminals of the building block by inter-connecting the And terminals of one of three available sets and may be seen as equivalent to connecting terminal T and terminal X in Figures 1 to 3. Now, assuming the modification in Figure 2 is employed and a binary representation has been applied to the unit placing core 1 in state "*b*," a subsequent A clock pulse drives the core to state "*a*" and the true output pulse at terminal T is applied through the regeneration winding 2 to the base of transistor 3, pulsing the input winding 2. This pulse is maintained by the transistor until after the A clock pulse has terminated and causes the core to be restored to point "*b*." A succeeding clock pulse again drives the core to state "*a*" and the action is repeated each cycle with information recirculated until circuit 41 coupling terminals T and X is opened. It is to be noted that the delay circuit thus provided does not require continuous pulsing or regeneration as the information is stored statically in the core until the winding 17 is pulsed.

With the all core packaged unit of Figure 3 employed as the pulse delay device and core 1 initially placed in state "*b*," the A clock pulse drives the core to state "*a*" and the output appearing on terminal T is applied to the diode logic as at terminal X. This pulse now drives winding 31 of core 30 causing this core to flip to state "*b*." The B pulse following the A pulse that caused read out of core 1, now causes core 30 to reassume state "*a*" and winding 2 of core 1 is pulsed. Core 1 now traverses its hysteresis loop back to state "*b*" and the succeeding A clock pulse reverses its state to develop a succeeding output on terminal T, delayed by the interval between successive A pulses as in the other basic unit.

Each basic unit as employed in a system organization derives input signals from other similar components and an example of such an arrangement is illustrated in connection with Figure 7 where a unit 50 is shown employed as a flip-flop device. Here a true pulse or "1" signal, designated as the "set" input, is put on one group of And input terminals designated 50X from a component 51 and is recirculated from the true output terminal 50T of that unit to a second group of And input terminals designated 50Y in a manner like that shown for Figure 6. Two of the 50Y And terminals are interconnected and the remaining terminal of this And input, the "reset" input, is connected to the negation output terminal 52C of a further basic unit 52. Unit 52 and the flip-flop unit 50 are driven in synchronism by the A or the AB clock pulse source, depending on the type of basic unit employed, and the output terminal 52C is held at its normal −6 volt level allowing the true output of unit 50 to recirculate. When the unit 52 develops a complement output representing a binary "0" or with the input of a binary "1" to this unit, however, its complement output rises to or above ground potential in synchronism with the recirculated pulse from terminal 50T and blocks its entry at the 50Y And circuit input terminals. The unit 50 has then turned over and terminal 50T remains at ground level until a binary "1" is applied to unit 51 and therethrough to the 50X terminal of unit 50 whereupon the action described is repeated.

Referring now to Figure 8, a shift register is illustrated that is capable of either right or left shift of the information stored in a group of basic units labeled 61, 62 and 63. Information is fed into the register from a parallel source through leads 65–1 to **65–*n* and is delivered in parallel on leads 66–1 to 66–*n*. The input leads 65 are each coupled to one Z And terminal of a corresponding unit and entry takes place when the other Z terminals are pulsed in coincidence from a Gate In source bus 67. The true output terminal T of each component is coupled to the parallel output leads 66–1 to 66–*n* and to an X And input terminal of a succeeding unit, with the other X terminals connected to a right shift bus 68. Due to the internal delay provided by the transistor 3 of each unit or by the B time pulsing of the core 30 in the all core unit, as described heretofore, each basic network package may develop an output and substantially simultaneously accept an input so that on pulsing the line 68, the information shifts successively to the right. The true output terminal T of each unit is also connected to the Y And circuit input of the preceding unit, with the other Y terminals of each unit connected to a Left Shift bus 69**. Pulsing of this bus causes a sequential left shift with each applied clock pulse and synchronous gate pulse.

Figure 9 illustrates a serial full adder using two shift registers such as described in connection with Figure 8, with one register storing a number M and the other a number N that are to be added. Each multidigit number is advanced simultaneously by right shift pulses applied to the leads 68 from a shift pulse generator 96 operated in synchronism with the A or A and B clock pulses applied to the packaged bit registers. A pulses being required for the packaged units of the type shown in Figures 1 and 2 while A and B pulses are required for the type shown in Figure 3, as explained heretofore. In forming an adder with this input, a first basic component designated element 70 is coupled to the terminal registers to develop a partial sum if the digit advanced from register M is a "1" and that from register N is a "0," or if that from M is a "0" and that from N is a "1." A further basic component 71 is provided to develop a carry signal if both digits shifted to the terminal stages of the shift registers are "1's." The carry from a preceding sum cycle is temporarily stored or delayed in another component 72 and is added to the partial sum signal to form a true sum in a still further component 73, with the carry developed in the current cycle simultaneously transferred from component 71 to component 72. The full adder, therefore, requires only four basic units.

A number of external connecting circuits have been described showing applications of the basic switching networks for control purposes, however, other uses are contemplated and it is not intended that the invention be limited to the specific environments here demonstrated nor to the bias voltages and other circuit constants recited in the description or shown in the drawings.

Further, in so far as the basic network is concerned it is to be understood that more than one unit may be driven from the output of a single unit with proper winding design.

While there have been shown, described and pointed out the fundamental novel features of this invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A logical switching device comprising a core of magnetic material capable of assuming alternate states of stability, an input signal winding on said core energized by a transistor device, means including an input signal source and a regeneration winding on said core for triggering said transistor, a read out winding on said core, means for energizing said read out winding and a pair of separate and unconnected output windings on said core adapted to develop voltage pulses of opposite polarity in response to energization of said read out winding and resetting of said core from one to the other stable state.

2. A switching component adapted for use with other similar components in performing logical switching functions comprising a saturable magnetic core capable of assuming alternate states of stability, an input signal winding on said core, a read out winding on said core, a magnetic amplifier coupled to said input winding and adapted to deliver an amplified signal thereto at a first time interval, means to activate said read out winding at a second time interval, and a pair of output windings on said core adapted to provide complementary output pulses at said second time interval when said core is reset from one to the other stable magnetic state.

3. A logical switching network comprising a magnetic core capable of assuming alternate states of stability in representing binary information, a transistor, an input signal source connected to said transistor, an input winding on said core coupled to said transistor and adapted to be energized thereby when said transistor is triggered on by said input signal source, a clock pulse source, a read out winding on said core coupled to said clock pulse source, and a pair of separate and unconnected output windings on said core adapted to develop pulses of opposite polarity representing true and complement values in response to actuation of said read out winding when said core is reset from one to the other stable magnetic state.

4. A logical switching circuit comprising a magnetic element capable of assuming alternate stable states of magnetic remanence, an input signal winding on said element adapted to cause said element to assume a first of said stable states when energized, a read out winding on said element, a clock pulse source coupled to said read-out winding and adapted to cause said element to assume a second of said stable states, a pair of separate and unconnected output windings on said element adapted to develop signals of opposite polarity representing true and complement values in response to the resetting of said element from said first to said second state.

5. A logical switching network comprising a core of magnetic material capable of assuming alternate states of stability in representing binary information, pulse amplifier means, an input winding on said core coupled to said pulse amplifier means and adapted to be energized thereby to cause said core to assume a first of said stable states, a clock pulse source, a read out winding on said core coupled to said clock pulse source and adapted to cause said element to assume a second of said stable states, a pair of separate and unconnected output windings on said core adapted to develop signals of opposite polarity representing true and complement values in response to the resetting of said core from said first to said second stable state.

6. A logical switching network comprising a core of magnetic material capable of assuming alternate states of stability in representing binary information, an input signal source, pulse amplifier means, an input winding on said core coupled to said pulse amplifier means and adapted to be energized therefrom in causing said core to assume a first of said stable states, a regeneration winding on said core coupled to said pulse amplifier means and to said input signal source, said regeneration winding adapted to activate said pulse amplifier means, a readout winding on said core coupled to said clock pulse source and adapted to cause said core to assume a second of said stable states, a pair of separate and unconnected output windings on said core adapted to develop signals of opposite polarity representing true and complement values in response to the resetting of said core from said first to said second stable state.

7. A network for performing logical switching functions comprising a core of magnetic material capable of assuming alternate states of stability in representing binary information, pulse amplifier means comprising a transistor, an input winding on said core coupled at one end to the collector contact of said transistor and at the other end to a negative bias source, a regeneration winding on said core having one terminal coupled to the base contact of said transistor with the other terminal adapted to receive input signals whereupon said transistor is activated and current flow through said input winding causes said core to assume a first of said stable states, a read out winding on said core, a clock pulse source coupled to said read out winding and adapted to cause said core to assume a second of said stable states, and a pair of output windings on said core adapted to develop signals of opposite polarity representing true and complement values in response to the resetting of said core from said first to said second stable state.

8. A network for performing logical switching functions comprising a core of magnetic material capable of assuming alternate states of stability, a plurality of diode And circuits coupled to a diode Or circuit, a transistor amplifier, a winding on said core coupled to said diode Or circuit and to said transistor, an input winding on said core energized from said transistor, a read out winding on said core, and a pair of output windings on said core adapted to develop pulses of opposite polarity in response to energization of said read out winding and resetting of said core from one to the other stable state.

9. A logical switching circuit comprising a magnetic element capable of assuming alternate stable states of magnetic remanence, a plurality of diode And circuits coupled to a diode Or circuit, an input signal winding on said element, means including an amplifier device for coupling said diode Or circuit output to said input winding, a read out winding on said element, a pulse source coupled to said read out winding and adapted to cause said element to assume an initial one of said stable states, and a pair of output windings on said element adapted to develop signal pulses of opposite polarity representing true and complement values in response to the resetting of said element to said initial state from the other state.

10. A network for performing logical switching functions comprising a core of magnetic material capable of assuming alternate states of stability in representing binary information, an input signal circuit comprising a plurality of diode And circuits coupled to a diode Or circuit, pulse amplifier means comprising a transistor, an input winding on said core coupled at one end to the collector contact of said transistor and at the other end to a negative bias source, a regeneration winding on said core having one terminal coupled to the base contact of said transistor with the other terminal connected to the output of said diode Or circuit whereupon signals applied to said input signal circuit activate said transistor and current flow through said input winding causes said core to assume a first of said stable states, a read out winding on said core, a clock pulse source coupled to said read out winding and adapted to cause said core to assume a second of said stable states, and a pair of output windings on said core adapted to develop signals of opposite polarity representing true and complement values in response to the resetting of said core from said first to said second stable state.

11. A logical switching circuit comprising a magnetic element capable of assuming alternate stable states of magnetic remanence, a plurality of diode And circuits coupled to a diode Or circuit, an input winding on said element, means including a magnetic amplifier device for coupling said diode Or circuit output to said input winding, a read out winding on said element adapted when pulsed to cause said element to assume an initial one of said stable states, and output winding means on said element adapted to provide pulses of opposite polarity representing true and complement values in response to resetting said element to said initial state from the other state of remanence.

12. A logical switching circuit as set forth in claim 4 including a magnetic amplifier device, said input winding being coupled to said magnetic amplifier device and adapted to be energized therefrom.

13. A switching component as set forth in claim 2 wherein said magnetic amplifier comprises a further saturable magnetic core having winding means including an output winding coupled to said input winding.

References Cited in the file of this patent

UNITED STATES PATENTS

| | | |
|---|---|---|
| 2,673,337 | Avery | Mar. 23, 1954 |
| 2,695,993 | Haynes | Nov. 30, 1954 |
| 2,708,722 | An Wang | May 17, 1955 |
| 2,710,928 | Whitney | June 14, 1955 |
| 2,772,370 | Bruce et al. | Mar. 27, 1956 |
| 2,760,088 | Pittman et al. | Aug. 21, 1956 |
| 2,766,388 | Wulfing | Oct. 9, 1956 |
| 2,779,934 | Minnick | Jan. 29, 1957 |

OTHER REFERENCES

"Electrical Engineering," February 1954, p. 164, article "Boolean Algebra in Electronic Circuit Desgn," by S. H. Washburn.